(12) United States Patent
Mazar et al.

(10) Patent No.: US 11,797,600 B2
(45) Date of Patent: Oct. 24, 2023

(54) TIME-SERIES ANALYTICS FOR DATABASE MANAGEMENT SYSTEMS

(71) Applicant: OWNBACKUP LTD., Tel Aviv (IL)

(72) Inventors: Yehonatan Mazar, Tel Aviv (IL); Ori Yankelev, Tel Aviv (IL); Roi Dover, Petah Tikva (IL); Adrian Kunzle, New York, NY (US)

(73) Assignee: OWNBACKUP LTD., Tel Aviv (IL)

( * ) Notice: Subject to any disclaimer, the term of this patent is extended or adjusted under 35 U.S.C. 154(b) by 197 days.

(21) Appl. No.: 16/950,963

(22) Filed: Nov. 18, 2020

(65) Prior Publication Data

US 2022/0156310 A1 May 19, 2022

(51) Int. Cl.
| | |
|---|---|
| *G06F 16/51* | (2019.01) |
| *G06Q 10/10* | (2023.01) |
| *G06Q 10/0631* | (2023.01) |
| *H04L 67/06* | (2022.01) |
| *G06Q 30/016* | (2023.01) |

(Continued)

(52) U.S. Cl.
CPC ............ *G06F 16/51* (2019.01); *G06F 16/538* (2019.01); *G06Q 10/06315* (2013.01); *G06Q 10/10* (2013.01); *G06Q 30/016* (2013.01); *G06Q 40/12* (2013.12); *H04L 67/06* (2013.01)

(58) Field of Classification Search
CPC ........ G06F 16/51; G06F 16/538; G06F 16/53; G06F 16/532; G06F 16/535; G06F 16/50; G06F 16/55; G06Q 10/06315; G06Q 10/10; G06Q 30/016; G06Q 40/12; G06Q 10/063; G06Q 10/0631; G06Q 10/06311; G06Q 10/06312; G06Q 10/06313; G06Q 10/06314; G06Q 10/06316; G06Q 30/00; G06Q 30/01; G06Q 30/014; G06Q 30/012; G06Q 30/018; G06Q 40/123; G06Q 40/125; G06Q 40/128; G06Q 30/015; H04L 67/06; H04L 67/01
See application file for complete search history.

(56) References Cited

U.S. PATENT DOCUMENTS

| | | | |
|---|---|---|---|
| 6,460,055 B1* | 10/2002 | Midgley | ............ G06F 11/2071 709/236 |
| 8,364,648 B1 | 1/2013 | Sim-Tang | |

(Continued)

FOREIGN PATENT DOCUMENTS

EP      2131284 A1     12/2009

OTHER PUBLICATIONS

International Application # PCT/IB2021/055251 Search Report dated Oct. 10, 2021.

(Continued)

*Primary Examiner* — Kris E Mackes
*Assistant Examiner* — Cecile H Vo
(74) *Attorney, Agent, or Firm* — KLIGLER & ASSOCIATES PATENT ATTORNEYS LTD (57) ABSTRACT

Methods, apparatuses and computer program products implement embodiments of the present invention that include capturing a series of point-in-time images of a database including one or more tables, each of the tables including one or more fields. Upon receiving, from a user, a query with respect to a variation of a given field over a specified period of time, the point-in-time images are analyzed in order to extract the variation; and the extracted variation is presented to the user.

38 Claims, 9 Drawing Sheets

(51) Int. Cl.
*G06F 16/538* (2019.01)
*G06Q 40/12* (2023.01)
*G06Q 30/00* (2023.01)

(56) References Cited

U.S. PATENT DOCUMENTS

| | | | |
|---|---|---|---|
| 8,732,213 B2 | 5/2014 | Sowell et al. | |
| 11,080,336 B2* | 8/2021 | Van Dusen | G06Q 50/01 |
| 11,157,463 B2* | 10/2021 | Barabas | G06F 16/21 |
| 11,269,731 B1 | 3/2022 | Vig et al. | |
| 2008/0121690 A1* | 5/2008 | Carani | G01S 5/0294 |
| | | | 235/376 |
| 2008/0313005 A1* | 12/2008 | Nessland | G06Q 10/06 |
| | | | 705/7.29 |
| 2012/0169842 A1* | 7/2012 | Chuang | H04N 7/181 |
| | | | 348/E7.001 |
| 2012/0191682 A1 | 7/2012 | Banerjee et al. | |
| 2013/0166568 A1 | 6/2013 | Binkert et al. | |
| 2013/0218840 A1 | 8/2013 | Smith et al. | |
| 2013/0275462 A1* | 10/2013 | Jung | G11B 27/329 |
| | | | 707/769 |
| 2013/0297610 A1* | 11/2013 | Devarakonda | G06F 16/1734 |
| | | | 707/737 |
| 2014/0058801 A1* | 2/2014 | Deodhar | G06Q 10/0639 |
| | | | 705/7.38 |
| 2014/0173135 A1 | 6/2014 | Varney et al. | |
| 2014/0351217 A1 | 11/2014 | Bostock | |
| 2015/0156213 A1* | 6/2015 | Baker | H04L 63/1416 |
| | | | 726/23 |
| 2016/0092484 A1* | 3/2016 | Finkler | G06F 16/258 |
| | | | 707/715 |
| 2017/0116552 A1* | 4/2017 | Deodhar | G06Q 10/0639 |
| 2017/0329983 A1* | 11/2017 | Grant | G06F 16/9535 |
| 2017/0344593 A1 | 11/2017 | Mullick et al. | |
| 2018/0285201 A1 | 10/2018 | Bangalore | |
| 2020/0089798 A1* | 3/2020 | Ganichot | G06F 16/254 |
| 2020/0110792 A1* | 4/2020 | Tsabba | G06F 3/167 |
| 2020/0389495 A1* | 12/2020 | Crabtree | G06F 16/2477 |
| 2021/0019288 A1* | 1/2021 | Pang | G06F 16/211 |
| 2021/0326793 A1 | 10/2021 | Frankel | |
| 2022/0197904 A1* | 6/2022 | Gillis | G06F 16/2455 |
| 2022/0334725 A1 | 10/2022 | Mertes et al. | |

OTHER PUBLICATIONS

Oracle, "Oracle Autonomous Database," pp. 1-16, year 2021, as downloaded from https://www.oracle.com/autonomous-database/.
Google, "Trusting your data with Google Cloud Platform", Whitepaper, pp. 1-17, Sep. 2019.
Kunzle et al., U.S. Appl. No. 17/528,290, filed Nov. 17, 2021.
International Application # PCT/IB2021/060550 Search Report dated Feb. 24, 2022.
Kunzle et al., U.S. Appl. No. 63/115,076, filed Nov. 18, 2020.
Oracle, "Netsuite Erp", data sheet, pp. 1-2, Jun. 4, 2019.
Sage Group PLC, "Sage Business Cloud Accounting", Product Brochure, pp. 1-6, Apr. 28, 2020.
Salesforce, "change Data Capture Developer Guide", Version 49.0, pp. 1-65, Sep. 1, 2020.
Slack Technologies, "Data Management Transparency and Control", pp. 1-5, Sep. 27, 2020.
Microsoft Corporation, "SQL Server 2019 editions", pp. 1-3, Oct. 29, 2019.
Sureka, A., "28 Important Zendesk features for Better Customer Support", pp. 1-12, Jan. 15, 2019 downloaded from https://www.clariontech.com/platform-blog/28-important-zendesk-features-for-better-customer-support.
Nevogt, D., "JIRA Project Management: A How-To Guide for Beginners", pp. 1-17, May 16, 2019 downloaded from https://blog.hubstaff.com/jira-project-management-guide-beginners/.
U.S. Appl. No. 17/528,290 Office Action dated Nov. 10, 2022.

* cited by examiner

| DATE | TIME | ID | NAME | POSTAL CODE | FAX | EMAIL |
|---|---|---|---|---|---|---|
| 06-JAN-20 | 15:43 | 567 | ALAN JONES | 10023 | 123-456-5678 | |
| 13-JAN-20 | 11:25 | 567 | ALAN JONES | 11598 | 123-456-5678 | |
| 13-JAN-20 | 11:25 | 685 | BETH SMITH | N12 8SE | | BETH@EMAIL.COM |

TIME-SERIES ANALYTICS FOR DATABASE MANAGEMENT SYSTEMS

FIELD OF THE INVENTION

The present invention relates generally to database management systems, and particularly to configuring database data to enable processing time-series analyses on the data.

BACKGROUND OF THE INVENTION

Database management systems are used be used for storing and managing large amounts of data. A database engine can sort, change and present the information stored in the database. Two popular configurations for storing data in a database are row-based and column-based. Row-based databases have an ability to write data very quickly, and are therefore typically used for processing real-time transactions. Column-based database tables have an ability to aggregate large volumes of data for a subset of columns, and are therefore typically used for processing highly analytical queries.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method including capturing, by a processor, a series of point-in-time images of a database including one or more tables, each of the tables including one or more fields, receiving, from a user, a query with respect to a variation of a given field over a specified period of time, analyzing the point-in-time images in order to extract the variation, and presenting the extracted variation to the user.

In some embodiments, capturing the point-in-time images includes capturing the point-in-time images at predefined intervals.

In a first embodiment, a given table includes a customer relationship management data file.

In a second embodiment, a given table includes an enterprise resource planning file.

In a third embodiment, a given table includes an accounting data file.

In a fourth embodiment, a given table includes a customer service system data file.

In a fifth embodiment, a given table includes a messaging system data file.

In one embodiment, a given table includes a set of records, and wherein capturing a given point-in-time image of the database includes capturing the records in the given table.

In another embodiment, capturing the records includes capturing all the records in the given table.

In an additional, embodiment capturing the records includes capturing a subset the records in the given table.

In a further embodiment, analyzing the series of point-in-time images includes generating a database table including the series of point-in-time images, and querying the generated database table.

In a supplemental embodiment, generating a database table includes generating a column-based database table.

In one embodiment, the method also includes generating and maintaining a unified schema of the database that stores a schema change in the series of point-in-time images used to generate the database table.

In another embodiment, the series of point-in-time images includes a first given image including a first set of fields captured at a first time and a second given image including a second set of fields captured at a second time subsequent to the first time, and wherein the schema change includes a given field in the second set that is not in the first set.

In some embodiments, the point-in-time images captured during the specified period of time includes the first and the second given images, and wherein presenting the extracted variation includes presenting the first given image, and presenting, in the first image a specified value for the given field.

In an additional embodiment, the series of point-in-time images includes a first given image including a first set of fields captured at a first time and a second given image including a second set of fields captured at a second time subsequent to the first time, and wherein the schema change includes a given field in the first set that is not in the second set.

In some embodiments, the point-in-time images captured during the specified period of time includes the first and the second given images, and wherein presenting the extracted variation includes presenting the second given image, and presenting, in the second image a specified value for the given field.

In a further embodiment, the series of point-in-time images includes a first given image captured at a first time and a second given image including captured at a second time subsequent to the first time, wherein the first given image includes a field having a first data type, wherein the second given image includes a field having a second data type, and wherein the schema change includes a difference between the first and the second data types.

In some embodiments, the point-in-time images captured during the specified period of time includes the first and the second given images, and wherein presenting the extracted variation includes presenting the field in first given image and the second given image using a specified data type.

In a supplemental embodiment, the series of point-in-time images includes a set of fields, and wherein the database table includes a subset of the set of fields.

There is also provided, in accordance with an embodiment of the present invention, an apparatus, including a storage device, and at least one processor configured to capture and store to the storage device a series of point-in-time images of a database including one or more tables, each of the tables including one or more fields, to receive, from a user, a query with respect to a variation of a given field over a specified period of time, to analyze the point-in-time images in order to extract the variation, and to present the extracted variation to the user.

There is additionally provided, in accordance with an embodiment of the present invention, a computer software product for protecting a computing system, the product including a non-transitory computer-readable medium, in which program instructions are stored, which instructions, when read by a computer, cause the computer to capture a series of point-in-time images of a database including one or more tables, each of the tables including one or more fields, to receive, from a user, a query with respect to a variation of a given field over a specified period of time, to analyze the point-in-time images in order to extract the variation, and to present the extracted variation to the user.

BRIEF DESCRIPTION OF THE DRAWINGS

The disclosure is herein described, by way of example only, with reference to the accompanying drawings, wherein:

FIG. 7 is a block diagram that shows a logical view of the partitioned database, in accordance with an embodiment of the present invention;

DETAILED DESCRIPTION OF EMBODIMENTS

Databases store data that can be updated on a continuing basis. Therefore, any queries on data stored in the database will typically be performed on current data stored in the database.

Embodiments of the present invention provide methods and systems for creating and managing database tables that can be used to process queries comprising time-based analytics of data stored in the database. As described hereinbelow, a series of point-in-time images of a database comprising one or more tables are captured, each of the tables comprising one or more fields. The term "point-in-time image" is used in the context of the present description and in the claims to refer to an image, i.e., a copy, of the data stored in one or more tables of a database at a specified point in time. Upon receiving, from a user, a query with respect to a variation of one of the tables over a specified period of time, the point-in-time images can be analyzed in order to extract the variation, and the extracted variation can be presented to the user.

System Description

Figure 1:
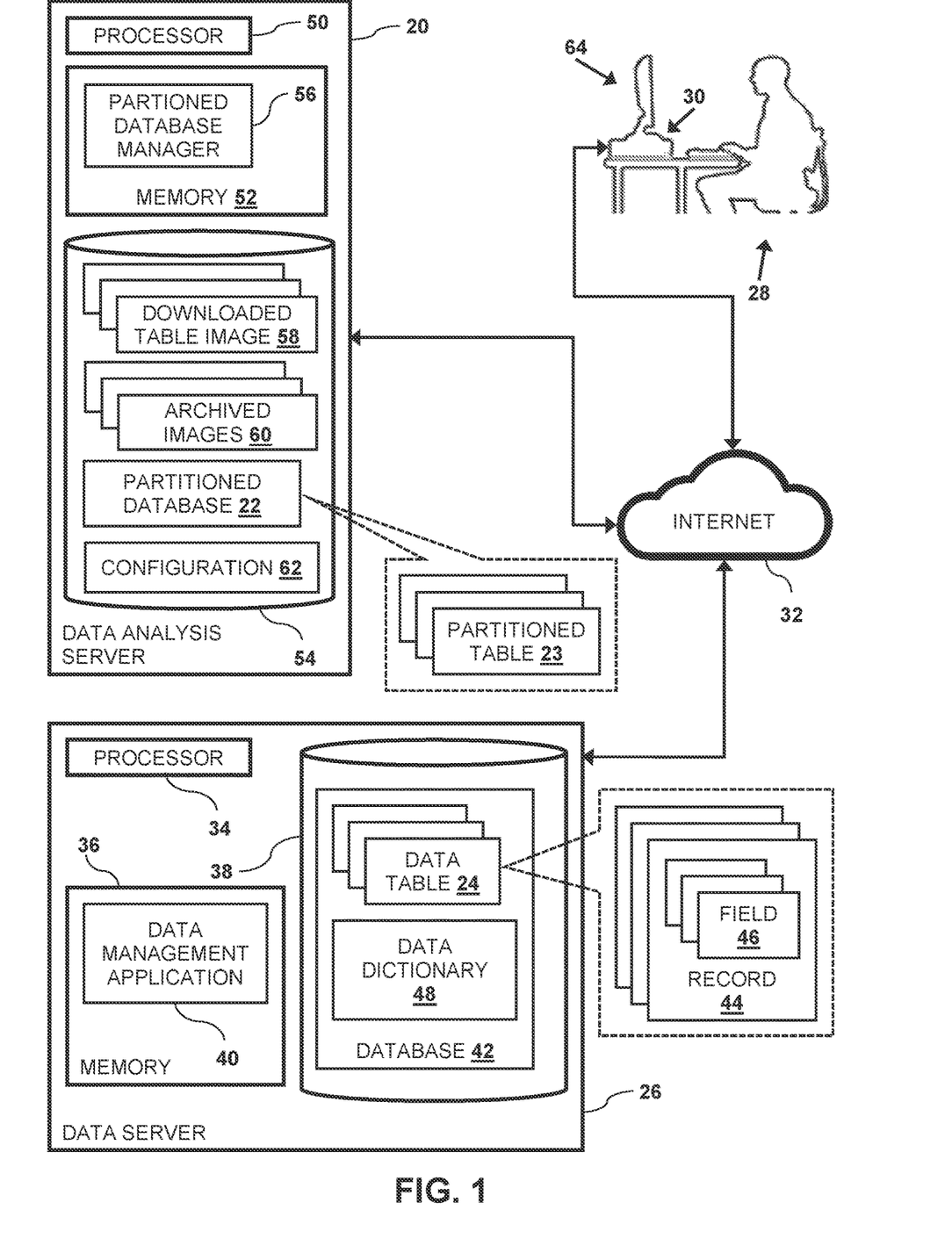
FIG. 1 is a block diagram that schematically shows a computing facility comprising a data analysis server that can download data and organize data into a partitioned database for processing time-series analysis queries, in accordance with an embodiment of the present invention.

FIG. 1 is a block diagram that schematically shows an example of a data analysis server 20 that manages a partitioned database 22 comprising a set of partitioned database tables 23, in accordance with an embodiment of the present invention. In embodiments described herein, data analysis server 20 creates and updates partitioned database 22 using data downloaded from remote data tables 24 stored on a data server 26. Upon creating partitioned database 22, data analysis server 20 can process time-series analysis queries received from a user 28 operating a client computer 30.

In the configuration shown in FIG. 1, data analysis server 20 can communicate with data server 26 and client computer 30 over a public network 32 such as the Internet. In some embodiments, data analysis server 20 can use a secure communication protocol when communicating with data server 26 in order to protect data transmitted over Internet 32.

Data server 26 comprises a server processor 34, a server memory 36 and a server storage device 38. In some embodiments, memory 36 can store a data management application 40 that processor 34 can execute to manage a database 42 comprising data tables 24 stored on storage device 38. In the configuration shown in FIG. 1, each given data table 24 comprises a set of data records 44, that store data in multiple data fields 46. In embodiments of the present invention, database 42 may comprise any type of data in a data repository that uses a specified or a dynamic structure to store the data.

In a first example, data management application 40 may comprise a database management system such as a structured query language (SQL) server (e.g., MICROSOFT SQL SERVER™, produced by Microsoft Corporation, One Microsoft Way Redmond, Wash. 98052-6399 USA), and data records 44 may comprise database tables.

In a second example, data management application 40 may comprise a customer relationship management (CRM) system such as SALESFORCE™ (produced by salesforce.com, inc., Salesforce Tower 3rd Floor, 415 Mission Street, San Francisco, Calif. 94105 USA) and data records 44 may comprise CRM data files such as standard or custom SALESFORCE™ objects.

In a third example, data management application 40 may comprise a customer service system such as ZENDESK™ (produced by Zendesk Inc., 1019 Market Street, San Francisco, Calif. 94103 USA), and data records 44 may store customer service system ticket data files.

In a fourth example, data management application 40 may comprise an enterprise resource planning (ERP) system such as NETSUITE™ (produced by Oracle Corporation, 500 Oracle Parkway, Redwood City, Calif. 94065 USA), and data records 44 may store ERP data files.

In a fifth example, data management application 40 may comprise an accounting system such as SAGE BUSINESS CLOUD ACCOUNTING™ (produced by The Sage Group plc, North Park, Newcastle upon Tyne NE13 9AA, United Kingdom), and data records 44 may store accounting data files.

In a sixth example, data management application 40 may comprise a messaging application such as SLACK™ (produces by Slack Technologies, Inc., 500 Howard Street, San Francisco, Calif. 94105 USA), and data records 44 may store messaging system data files.

In a seventh example, data management application 40 may comprise a project management application such as JIRA™ (produced by Atlassian Corporation Plc, 341 George Street, Level 6, Sydney, NSW 2000, Australia), and data records 44 may store project management data files.

In addition to these examples, any other type of application 40 that is configured to manage information stored in data records 44 is considered to be within the spirit and scope of the present invention.

In some embodiments, storage device 38 can store a data dictionary 48 that defines the layout and configuration of data fields 46 in data records 44.

Data analysis server 20 comprises an analysis processor 50, an analysis memory 52 and an analysis storage device 54. In some embodiments, processor 50 can execute, from memory 52, a partitioned database manager 56 that can perform embodiments described herein such as maintaining partitioned database 22, and processing queries for data stored in the partitioned database.

In the configuration shown in FIG. 1, partitioned database manager 56 manages the following data entities stored on storage device 54:

- Partitioned database 22. Partitioned database 22 is described in the respective descriptions referencing FIGS. 4, 5 and 7 hereinbelow.
- A set of downloaded table images 58. In embodiments described herein, partitioned database manager 56 can retrieve, at predefined intervals (e.g., daily), data from each given data table 24, and store the retrieved data to a corresponding downloaded table image 58. Each given table image 58 comprises the data stored in the corresponding data table at a specific point in time (i.e., that the data is downloaded). Downloaded table images 58 are described in the description referencing FIG. 2 hereinbelow.
- A set of archived table images 60. In embodiments described herein, upon downloading data from data tables 24 and populating the set of downloaded table images 58, partitioned database manager 56 can archive the set of downloaded table images 58, as described in the description referencing FIG. 3 hereinbelow. The archived set 60 of downloaded table images 58 can be used to recreate partitioned database 22, as described in the description referencing FIG. 10 herein below.
- A configuration file 62. In embodiments described herein, configuration file 62 can store information as to which specific data fields 46 in specific data tables 24 are to be included in partitioned database 22. Configuration file 62 is described in the description referencing FIG. 6 hereinbelow.

In the configuration shown in FIG. 1, client computer 30 comprises a display 64 that the client computer can use to present query results, as described in the description referencing FIG. 8 hereinbelow.

In some embodiments, the tasks performed by partitioned database manager 56 may be split among multiple physical and/or virtual computing devices. In other embodiments, the tasks performed by data management application 40 and/or partitioned database manager 56 may be performed in a data cloud.

Examples of memories 36, 52 and storage devices 38, 54 include dynamic random-access memories and non-volatile random-access memories. In some embodiments, the memories and/or the storage devices may comprise non-volatile storage devices such as hard disk drives and solid-state disk drives.

Processors 34 and 50 comprise general-purpose central processing units (CPU) or special-purpose embedded processors, which are programmed in software or firmware to carry out the functions described herein. This software may be downloaded to servers 20 and 26 in electronic form, over a network, for example. Additionally or alternatively, the software may be stored on tangible, non-transitory computer-readable media, such as optical, magnetic, or electronic memory media. Further additionally or alternatively, at least some of the functions of processors 34 and 50 may be carried out by hard-wired or programmable digital logic circuits.

As shown in FIG. 1, data analysis server 20 stores respective sets of partitioned tables 23 and archived images 60, and data server 26 stores a set of data tables 24. In embodiments described herein, data analysis server creates archived images from data tables 24, and creates partitioned tables 23 from the archive images. Therefore, each archived image 60 has a corresponding data table 24, and the archived images have a one-to-one correspondence with portioned tables 23.

Figure 2:
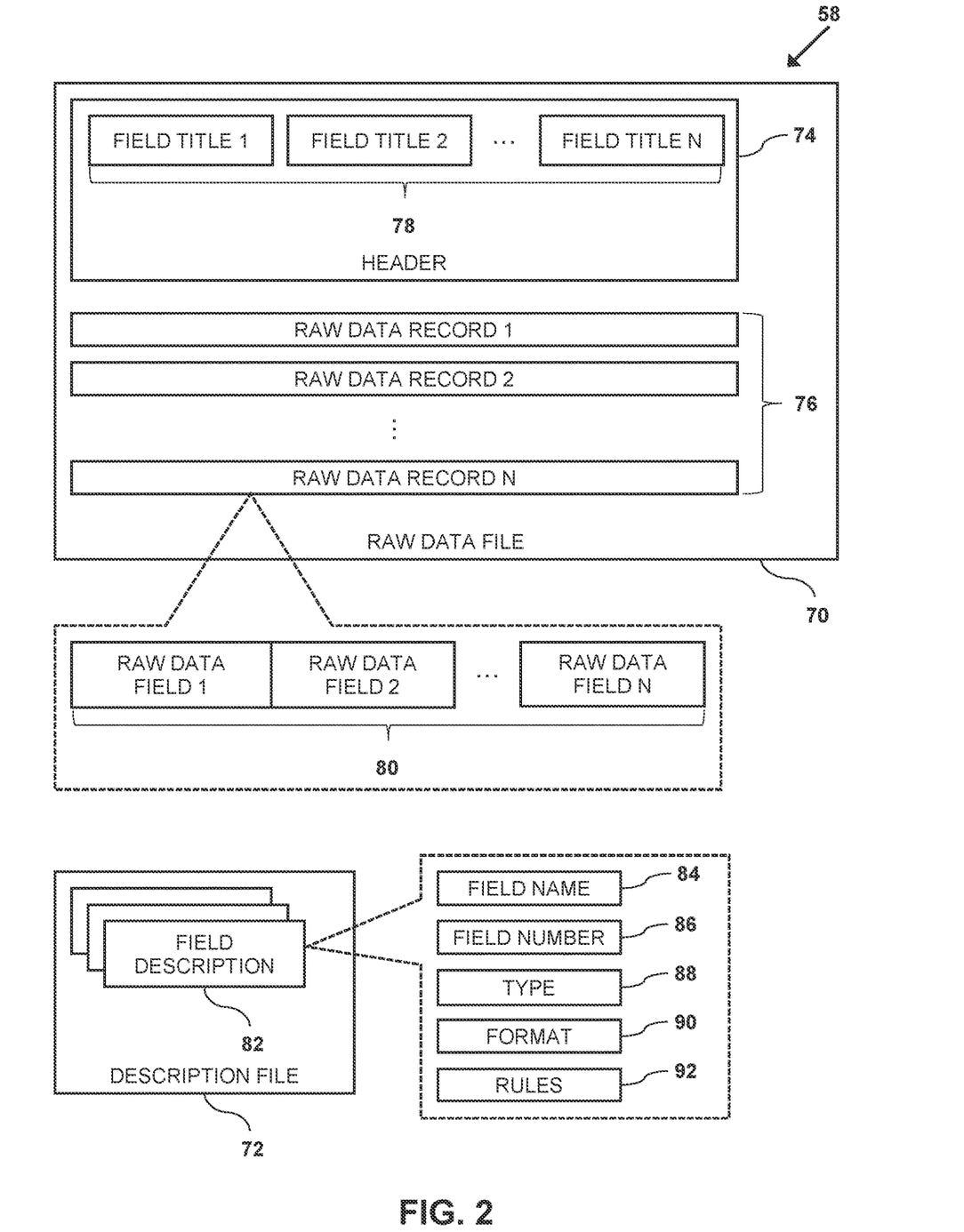
FIG. 2 is a block diagram that shows an example of the downloaded data that the data analysis server can download, in accordance with an embodiment of the present invention.

FIG. 2 is a block diagram that shows an example of a given downloaded table image 58 that stores data downloaded from a given data table 24, in accordance with an embodiment of the present invention. Each given table image 58 may comprise a raw data file 70 and a description file 72. In some embodiments partitioned database manager 56 can store raw data file 70 in a standard format use for data exchange. For example, file 70 may comprise a comma separated value (CSV) file.

In the configuration shown in FIG. 2 raw data file 70 comprises a header 74 and a set of raw data records 76. Header 74 comprises a set of field titles 78, and each raw data record 76 comprises a set of raw data fields 80 that have a one-to-one correspondence with field titles 78

In some embodiments, description file 72 comprises a set of field descriptions 82 that describe data fields 46 in data records 44 downloaded from the given data table. In some embodiments, raw data file 70 is populated the data fields in the downloaded table images. Field descriptions 82 have a one-to-one correspondence with field titles 78, and each of the field descriptions can store information such as:

- A field name 84. This can be the same as the corresponding field title 78.
- A field number 86. Since CSV files do not store fields at fixed locations, field number 86 can be used to identify where a given raw data field 80 is stored in a given raw data record 76. For example, since values in CSV files are separated by commas, field number 86 can indicate the location of the given raw given raw data field by the number of commas before or after the data for the given raw data field.
- A field type 88. Examples of field type 88 include date, numeric and text.
- A field format 90. In one example, the field format for numeric data can indicate a number of digits to the right of the decimal point. In another example, the field formation can describe formats for telephone numbers, postal (e.g., ZIP) codes, email addresses etc.
- One or more field rules 92. A given rule 92 can indicate a list of valid text/numeric data for a given raw data field 80, or minimum/maximum values for numeric data.

In some embodiments, each raw data file 70 stores data from all the fields in its corresponding data table 24.

Figure 3:
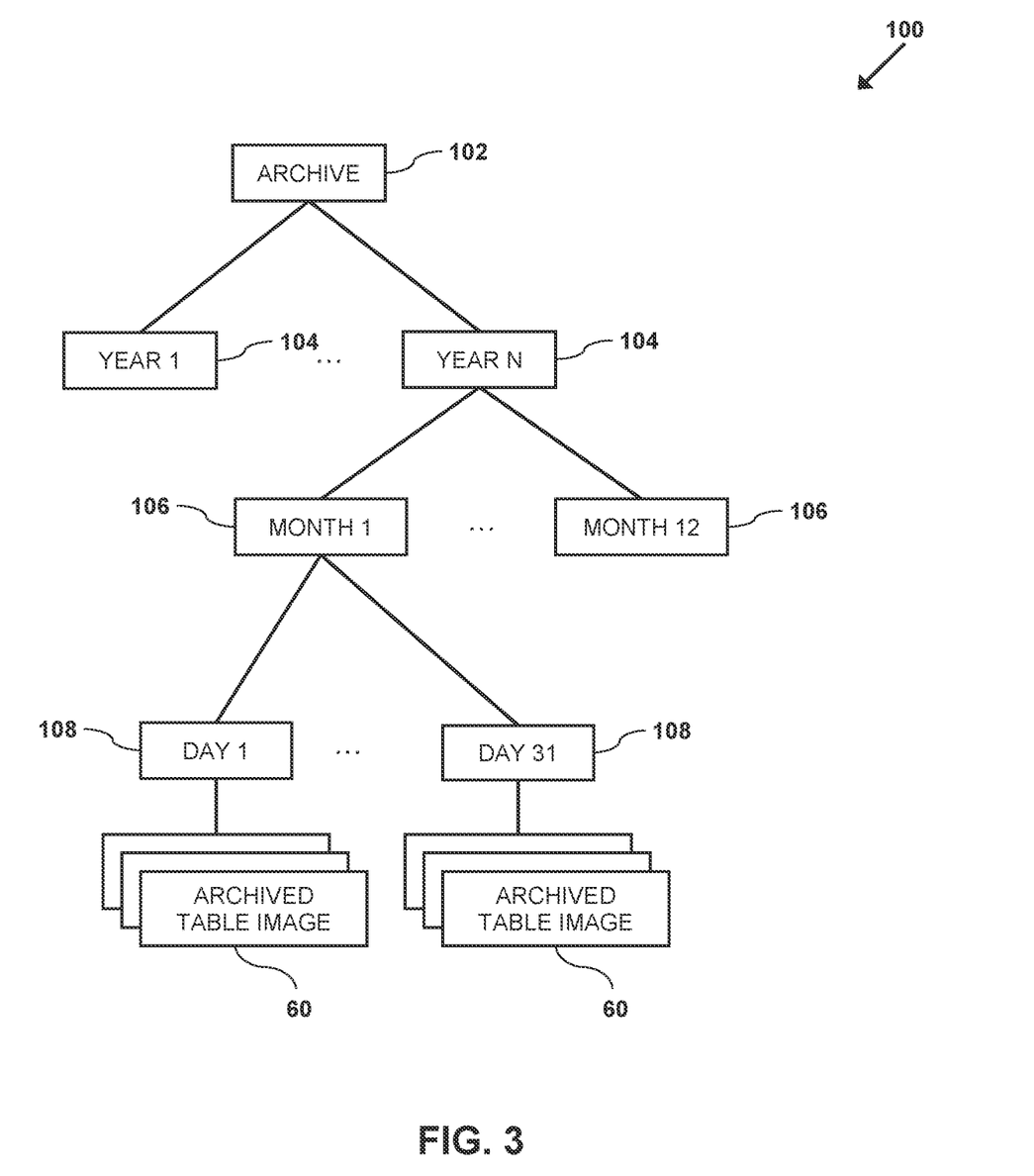
FIG. 3 is a block diagram that schematically illustrates an example of a directory structure that the data analysis server can use to store the downloaded data, in accordance with an embodiment of the present invention.

FIG. 3 is a block diagram that schematically illustrates an example of an archive directory structure 100 that data analysis server 20 can use to store archived table images 60 on storage device 54, in accordance with an embodiment of the present invention. In the configuration shown in FIG. 3, processor 50 can create archive directory structure 100 on storage device 38 as follows:

Create an archive directory 102.
        Create year directories 104 (i.e., subdirectories of directory 102) for each year during which partitioned database manager downloads images 58.
        Create month directories 106 (i.e., subdirectories of each given directory 104) for each given month during which partitioned database manager downloads images 58.
        Create day directories 108 (i.e., subdirectories of each given directory 106) for each given day that partitioned database manager downloads images 58.
        Upon downloading table images 58 on a given date, processor 50 creates a new directory 108 (and a new directory 106 if the given date is the first day in the current month, and a new directory 104 if the given date is the first day in the current year), the analysis processor stores the downloaded table images to the new directory.

In the configuration shown in FIG. 3, processor 50 archives all table images 58 downloaded on a given date to a single directory 108 corresponding to the given date. Therefore, each archived table image 60 comprises a copy of a given downloaded table image 58 that was captured at a specific point in time.

In one embodiment, the table images downloaded on a given date may comprise all the data stored in the corresponding data tables 24. In another embodiment the table images downloaded on a given date may comprise deltas (i.e., additions, deletions and changes) from the most recent previous archive table images 60.

In an additional embodiment, partitioned database manager 56 can download a given table image 58 upon detecting a change (e.g., an addition, a deletion or an update) to a given date record 44 in a given data table 24. In this embodiment, the given table image may simply comprise the detected change (i.e., not the entire table 24).

Figure 4:
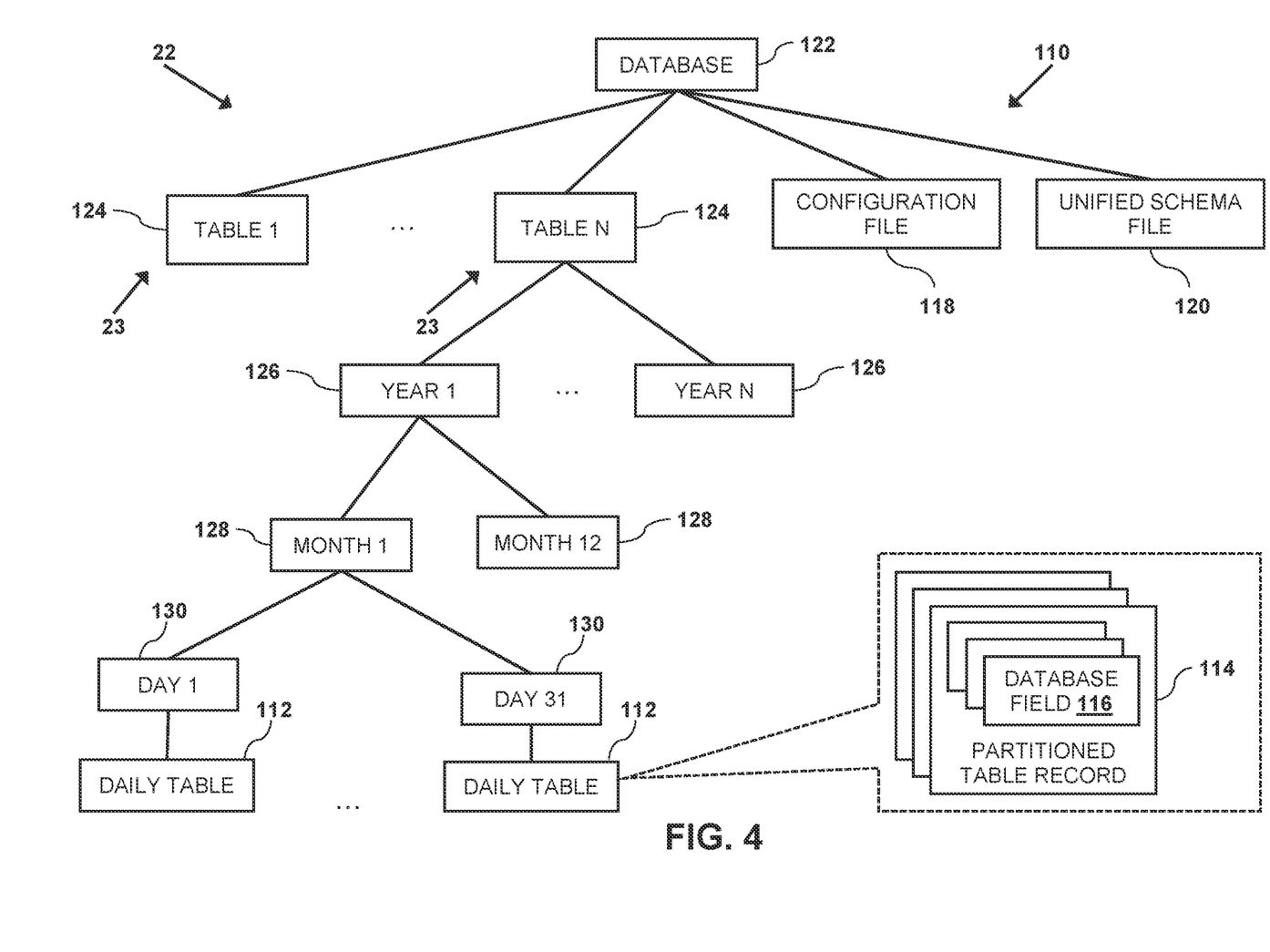
FIG. 4 is a block diagram that schematically illustrates an example of a directory structure that the data analysis server can use to store the partitioned database, in accordance with an embodiment of the present invention.

FIG. 4 is a block diagram that schematically illustrates an example of a database directory structure 110 that processor 50 can use to store partitioned database 22 on storage device 54, in accordance with an embodiment of the present invention. As described supra, partitioned database comprises a set of partitioned tables 23.

In the configuration shown in FIG. 4, each partitioned table 23 comprises multiple partitioned daily database tables 112, each of the partitioned daily tables comprising respective sets of partitioned database records 114 comprising respective partitioned database fields 116.

In embodiments of the present invention, partitioned database manager 56 creates a corresponding daily table 112 for a subset of archived table image 60. Therefore, for a given data table 24 having a plurality of corresponding archived table images 60, partitioned database manager 56 can create separate respective daily tables 112 for each of the corresponding archived table images 60. Deciding which daily tables 112 to create from archived image 60 is described in the description referencing FIG. 5 hereinbelow.

As described supra, each archived table image 60 comprises a copy of a given downloaded table image 58 that was captured at a specific point in time. In embodiments described herein, each daily image 112 comprises data from a corresponding archived table image 60 that was captured (i.e., from a given data table 24) at a specific point in time.

In some embodiments, partitioned database manager 56 can define each partitioned table 23 as a logical database table comprising set of physical daily tables 112. An example of a given partitioned table 23 implemented as a logical database table is described in the description referencing FIG. 7 hereinbelow.

To create daily table 112, partitioned database manager 56 can use information stored in a configuration file 118 and a unified schema file 120. Configuration file 118 is described in the description referencing FIG. 5 hereinbelow, and unified schema 120 is described in the description referencing FIG. 6 hereinbelow.

In some embodiments, processor 50 can create database directory structure 110 on storage device 38 as follows:

Create a database directory 122.
        Store configuration file 118 and unified schema 120 to database directory 122.
        Create, for each partitioned table 23, a corresponding table directory 124 as a subdirectory of directory 122
        Create, as needed, year directories 126 (i.e., subdirectories of directory 124) for each year during which partitioned database manager 56 created archived table images 60.
        Create, as needed, month directories 128 (i.e., subdirectories of directories 126) for each month (i.e., in the year referenced by its respective parent directory) during which partitioned database manager 56 created archived table images 60.
        Create, as needed, day directories 130 (i.e., subdirectories of directories 128) for each day (i.e., in the month referenced by its respective parent directory) during which partitioned database manager 56 created archived table images 60.

While the configuration of directory structure 110 in FIG. 4 shows partitioned database manager 56 creating tables 112 on a daily basis, creating the daily tables at other intervals is considered to be within the spirit and scope of the present invention. For example, partitioned database manager 56 can download table images 58 and create respective tables 112 at a higher frequency (e.g., every change to data tables 24, or every 4, 6 or 8 hours) or at a lower frequency (e.g., every 2, 4 or 7 days).

Also, while the configuration of directory FIG. 4 shows partitioned database manager 56 creating directory structure 110 with directories 126, 128 and 130 as subdirectories of directory 124, other configurations are considered to be within the spirit and scope of the present invention. For example, partitioned database manager 56 may generate directory structure 110 in a similar manner to directory structure 100, and store multiple daily tables 112 in a single daily directory 130.

Figure 5:
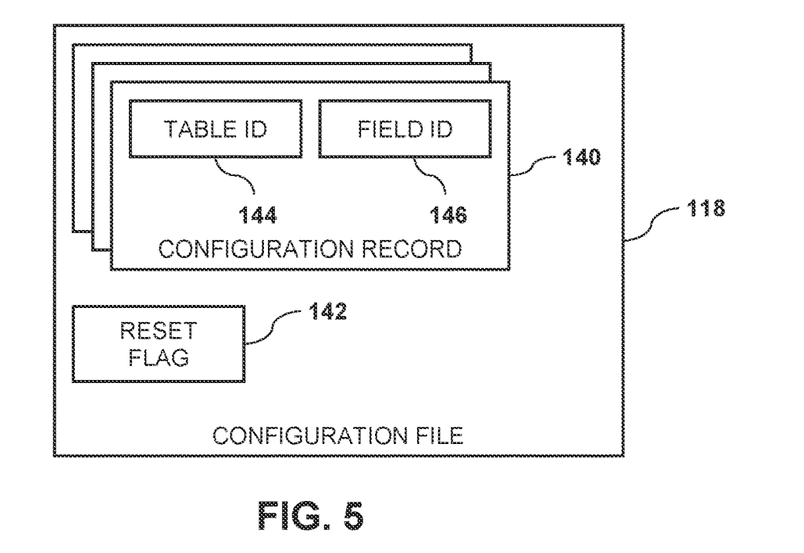
FIG. 5 is a block diagram that shows an example of a configuration file that the data analysis server can use to manage the partitioned database, in accordance with an embodiment of the present invention.

FIG. 5 is a block diagram that shows an example of configuration file 118 that partitioned database manager 56 can use to manage partitioned database 22, in accordance with an embodiment of the present invention. Configuration file 118 may comprises a set of configuration records 140 and a reset flag 142. Each configuration record 140 comprises a table identifier (ID) 144 referencing a given partitioned table 23 and a field ID 146 referencing a given partitioned database field 116. In some embodiments database field 116 may indicate a given field 46 to exclude from daily tables 112.

In some embodiments, partitioned database manager 56 can store, to a given configuration record 140, a given table ID referencing a given partitioned table 23, and a null/empty value to field ID 146. The null/empty value indicates that partitioned database manager 56 will include all fields 80 in the corresponding raw data file 70 in the given partitioned table.

In embodiments of the present invention, the partitioned database fields in given partitioned table 23 typically comprise a subset of the raw data fields in the corresponding archived table image 60. This is because user 28 may not need to query information stored in all fields 80.

Partitioned database manager 56 can use the information stored in configuration file 118 to perform the following:

When initializing partitioned database 22 at a first time, configuration file 118 defines which fields 80 from files 70 to store to partitioned tables 23. Partitioned database manager 56 can then use the information stored in configuration file 118 to initialize and update partitioned database manager 56.

At a second time subsequent to the first time, a given field 46 may be added to a given data table 24, and user 28 may want to include the new field in the corresponding partitioned table 23. In this instance, partitioned database manager 56 can start (i.e., at the second time) downloading the added field 46 to the table image 58 corresponding to the given data table, and add a new database field 116 to the corresponding partitioned table 23. In this example, configuration file 118 does not need to be changed, since field IDs 140 indicate which fields 46 to exclude when generating daily tables 112.

At a second time subsequent to the first time, a given field 46 whose information may be removed from a given data table 24, and this given field was previously store to a corresponding partitioned table 23. In this instance, partitioned database manager 56 can stop (i.e., at the second time) including the given field in the table image 58 corresponding to the given data table, and stop copying the given field to the corresponding partitioned table 23. In this example, configuration file 118 may need to be updated if configuration file did not store the field ID 146 for the given field (i.e., the given field was previously included in tables 112.

At a second time subsequent to the first time, user 28 may want to add and/or delete one or more fields 80 to partitioned database 22. In some embodiments, user 28 can set reset flag 142 which instructs partitioned database manager 56 to recreate all partitioned tables 23 from all archived images 60. Recreating partitioned database 22 is described in the description referencing FIG. 10 hereinbelow.

Figure 6:
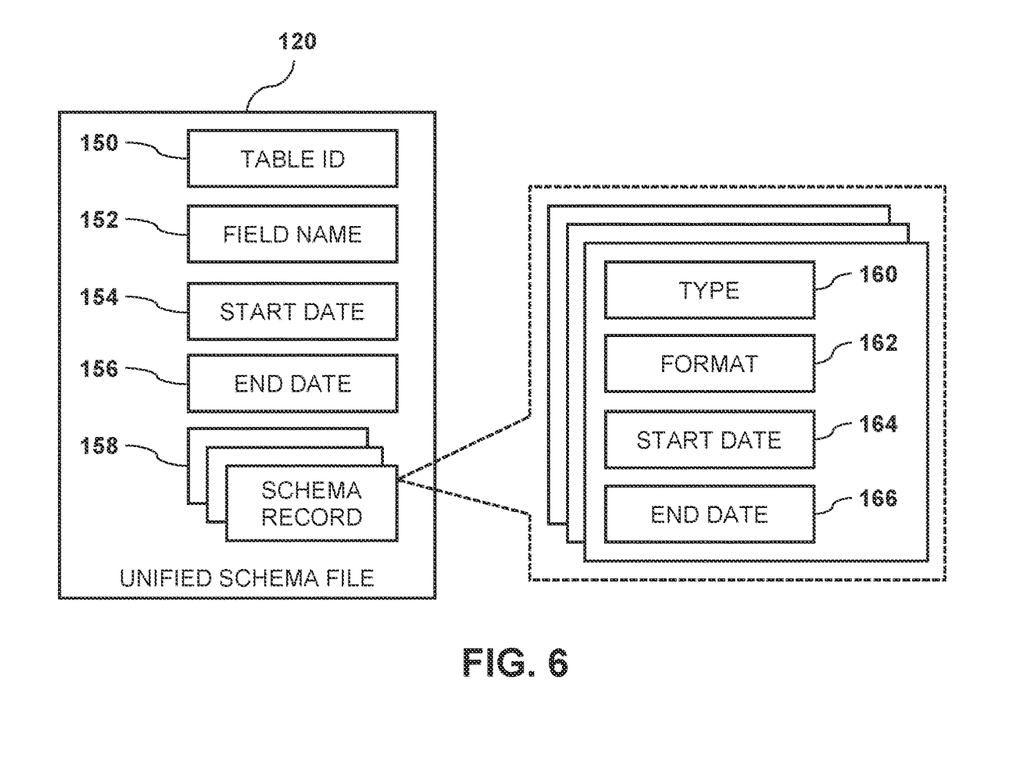
FIG. 6 is a block diagram that shows an example of a unified schema that the data analysis server can use to access the partitioned database, in accordance with an embodiment of the present invention.

FIG. 6 is a block diagram that shows an example of unified schema 120 that partitioned database manager 56 can use to access partitioned database 22, in accordance with an embodiment of the present invention.

As described supra, partitioned database manager 56 can use configuration file 62 select which fields 80 to include in partitioned database 22. This is because partitioned database manager 56 downloads all fields 46 in tables 24 to images 58, and all the data fields might not be needed for analysis. However, there may by instances when there is a change to the configuration (i.e., layout) of a given data table 24. Example of these changes for the given table include:

An addition of a new field 46. In this example, if partitioned database manager 56 receives a query to retrieve a value of this field for a date prior to the date the new field was added, the partitioned database manager can return a specific (e.g., blank/null) value in response to the query.

A deletion of a given field 46. In this example, if partitioned database manager 56 receives a query to retrieve a value of this field for a date subsequent to the date the given field was deleted, the partitioned database manager can return a specific (e.g., blank/null) value in response to the query.

A change in the date type of a given field 46. As described in the description referencing an example shown in FIG. 7 hereinbelow, the data type of the given field may be changed from numeric to text. In this example:

If partitioned database manager 56 receives a query to retrieve values for the given field during a time period when the data type for the given field was numeric, the partitioned database manager can return numeric values in response to the query.

If partitioned database manager 56 receives a query to retrieve values for the given field during a time period when the data type for the given field was text, the partitioned database manager can return text strings in response to the query.

If partitioned database manager 56 receives a query to retrieve values for the given field during a time period when there were different data types for the given field, the partitioned database manager can select a data type for the response to the query. In this example, partitioned database manager 56 can convert the numeric values to text strings, and return text strings in response to the query.

In an alternative embodiment, partitioned database manager 56 can simply assign a single format (e.g., text) that can be used to store the different data types.

A change to the format of a given field 46. For example, numeric data for the given field in archived table images 60 may be stored using either two-digit or three-digit precision. In this case, partitioned database manager can select a single format (e.g., three-digit precision) that can be used to store the different data formats.

In the configuration shown in FIG. 6, unified schema 120 comprises:

A table ID 150 referencing a given partitioned table 23.

A field name 152 referencing a given field 116 in the given table

A start date 154 indicating when the given field was added to the given partitioned table. In some embodiments, this can simply be the first date that partitioned database manager 56 downloaded the table image 58 corresponding to the given partitioned table.

An end date 156 indicating a date when the given field was removed from the given partitioned table. This can be blank/null If the given field is still in the given partitioned table.

One or more schema records 158 comprising:
A type 160 indicating a data type for the given field.
A format 162 indicating a format (e.g., length, decimal point location) of the given field.
A start date 164 indicating when data table 24 started storing data using data type 160 and/or format 162.
An end date 166 indicating when data table 24 stopped storing data using data type 160 and/or format 162. This can be blank/null if there is no change.

As described in the description referencing FIG. 4 hereinabove, a given partitioned table 23 comprises multiple daily tables 112 that partitioned database manager 56 generated from images 60 of a single given data table 24. Therefore, there are typically multiple identical records 114 in the given partitioned table (i.e., stored in different daily tables 112). In some embodiments, partitioned database manager 56 can generate a logical view for the given partitioned table that enables differentiation, thereby enabling the partitioned database manager to process time-series analysis queries.

FIG. 7 is a block diagram that shows an example of a logical table 170 comprising multiple partitioned table 23, in accordance with an embodiment of the present invention. In some embodiments, logical table 170 comprises logical records 172 and logical fields 174.

As described in the description referencing FIG. 4 hereinabove, a given partitioned table 23 comprises a set of daily tables 112 that are stored in respective directories 130, the daily tables comprising images of the corresponding data table 24 on different dates. The records 172 shown in FIG. 7 are from a first partitioned table 23 that partitioned database manager 56 created on Jan. 6, 2020 and a second partitioned table 23 that the partitioned database manager created on Jan. 13, 2020. In embodiments of the present invention partitioned database manager can present, to user 28, multiple partitioned tables 23 (i.e., comprising respective images pf the same daily table 23) as a single logical table 170.

In FIG. 7, logical records 172 and logical fields 174 can be differentiated by appending a letter to the identifying numeral, so that the logical records comprise logical records 172A-172C and the logical fields comprise logical fields 174A-174G. In the example shown in FIG. 7:

- Logical field 174A stores a date of the archived table image 60 from which data for a given logical record 172 was extracted.
- Logical field 174B stores a time (e.g., HOUR:MINUTE) indicating when the archived table image 60 from which data for a given logical record 172 was extracted.
- Logical field 174C stores a unique identifier each given logical record 172.
- Logical field 174D stores a name extracted from a field 80 of a record 76 in a given archived table image 60.
- Logical field 174E stores a postal code extracted from a field 80 of a record 76 in a given archived table image 60.
- Logical field 174F stores a fax number extracted from a field 80 of a record 76 in a given archived table image 60.
- Logical field 174G stores email address extracted from a field 80 of a record 76 in a given archived table image 60.

The example shown in FIG. 7 shows how fields 46 can be added, be deleted, and have different data types over time. In this example, a fax number is initially stored in a given data record 44, but is later replaced with an email address. The example also shows the data type of postal code changing from numeric to text.

Additionally, while the example in FIG. 7 shows table 170 configured as a row-based table, configuring table 170 as a column-based table is considered to be within the spirit and scope of the present invention. Configuring table 170 as a column-based table can help partitioned database manager 56 optimize processing time-series analysis queries on the data stored in daily tables 112.

Database Time Series Analytics

Figure 8:
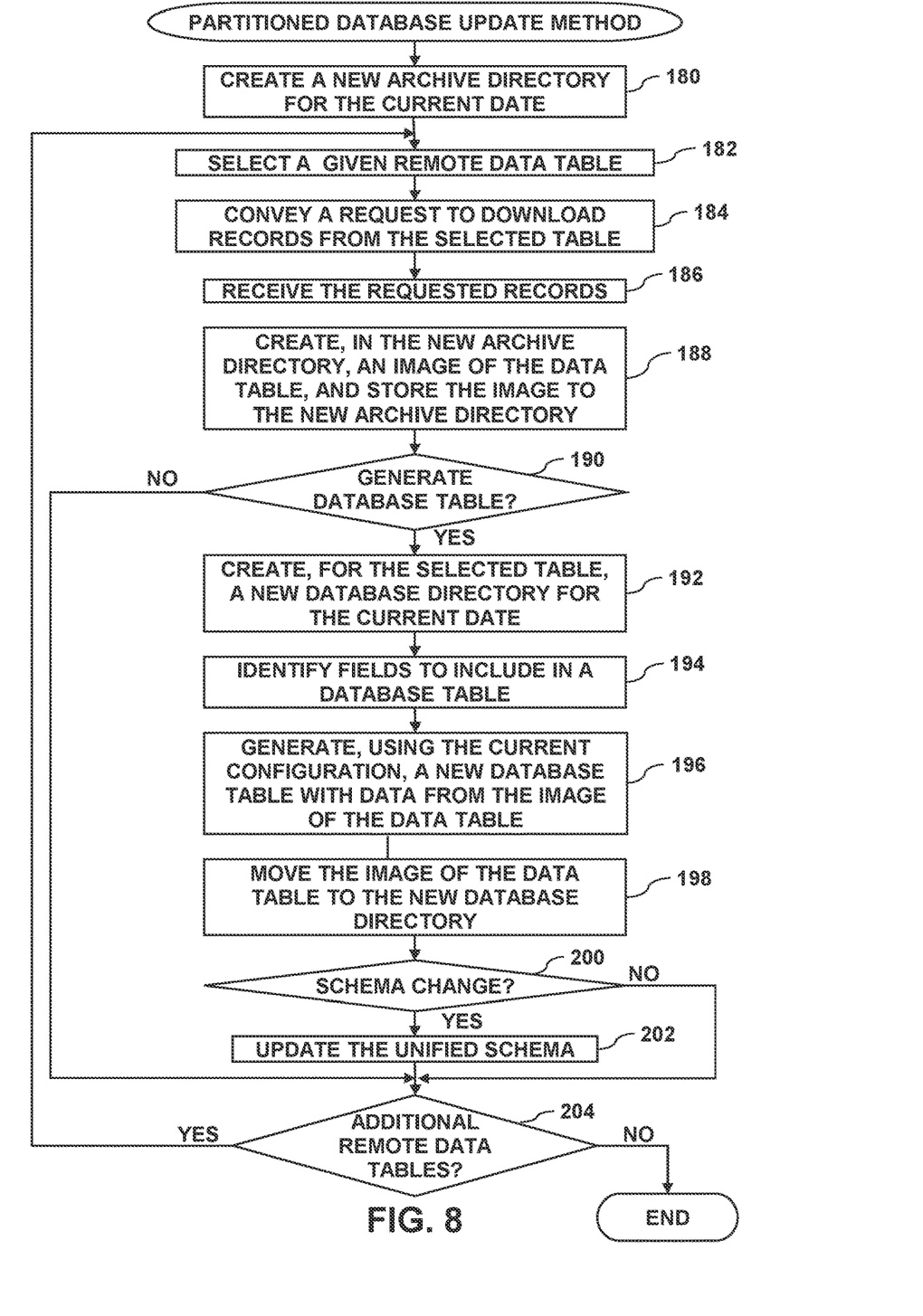
FIG. 8 is a flow diagram that schematically illustrates a method of initializing and updating the partitioned database, in accordance with an embodiment of the present invention.

FIG. 8 is a flow diagram that schematically illustrates a method of creating and updating the partitioned database, in accordance with an embodiment of the present invention. The steps below describe operations that partitioned database manager 56 can perform on a single given day.

In step 180, partitioned database manager 56 creates, on storage device 54, a new day directory 108 for the given day. If the given day is the first day of a month, partitioned database manager 56 will create a new month directory 106 prior to creating new directory 108. If the given day is the first day of a year, partitioned database manager 56 will create a new year directory 104 prior to creating new directory 106.

In step 182, partitioned database manager 56 selects a given data table 24, and in step 184, the partitioned database manager conveys, to data server 26, a request to retrieve a plurality of records 44 from the given data table. In one embodiment, the request may comprise a request to retrieve all records 44 in the given data table. In another embodiment, the request may comprise a request to only retrieve changes to the records in the given data table.

In step 186, partitioned database manager 56 receives (i.e., captures) the requested records, and stores them to storage device 54.

In step 188, partitioned database manager 56 creates, using the downloaded records (i.e., downloaded from the selected table 24), a new table image 58. Upon creating new table image 58, partitioned database manager 56 copies the created table image 58 to a new archived table image 60 in the new archive directory.

In step 190 partitioned database manager 56 checks table IDs 144 in configuration records 140 to see if a given partitioned table 23 is to be generated from the data table 26 selected in step 182. If a given partitioned table 23 is to be generated from the selected data table, then in step 192, partitioned database manager 56 creates, in the table directory 124 corresponding to the given data table, a new day directory 130 for the given day. If the given day is the first day of a month, partitioned database manager 56 will create a new month directory 128 prior to creating new directory 130. If the given day is the first day of a year, partitioned database manager 56 will create a new year directory 126 prior to creating new directory 128.

In step 194, partitioned database manager 56 identifies, in configuration file 118, which raw data fields 80 are to be included a new partitioned table 23 corresponding to the given data table. As describe supra, configuration 118 file may store field IDs 146 that are to be excluded from the new partitioned table. Partitioned database manager 56 can use this information to create the new partitioned table.

In step 196, partitioned database manager 56 generates, using the data stored in the identified raw data fields 80, a new partitioned database table 23, and in step 198 the partitioned database manager moves the created partitioned database table to the new day directory 130 (i.e., the day directory created in step 192).

Upon performing step 198, partitioned database manager 56 can analyze the identified fields to see if there is are any changes to the identified raw data fields 80 that require a change to unified schema file 120. As described supra, examples of changes can include a new raw data field 80, a deleted raw data field 80 or a change of the data type for a given raw data field.

In step 200, if partitioned database manager 56 detects a change that requires a change to unified schema file 120, then in step 202, the partitioned database manager updates the unified schema file 120 accordingly.

Finally, in step 204, if there are additional remote data tables 24 that were not yet selected in step 184, then the method continues with step 184. In other words, step 184, only selects previously unselected remote data tables 24.

Returning to step 204, if there are no unselected remote data tables 24, then the method ends.

Returning to step 200, if partitioned database manager 56 does not detect any change that requires a change to unified schema file 120, then the method continues with step 204. Returning to step 190, if a given partitioned table 23 is not to be generated from the selected data table, then the method continues with step 204.

Figure 9:
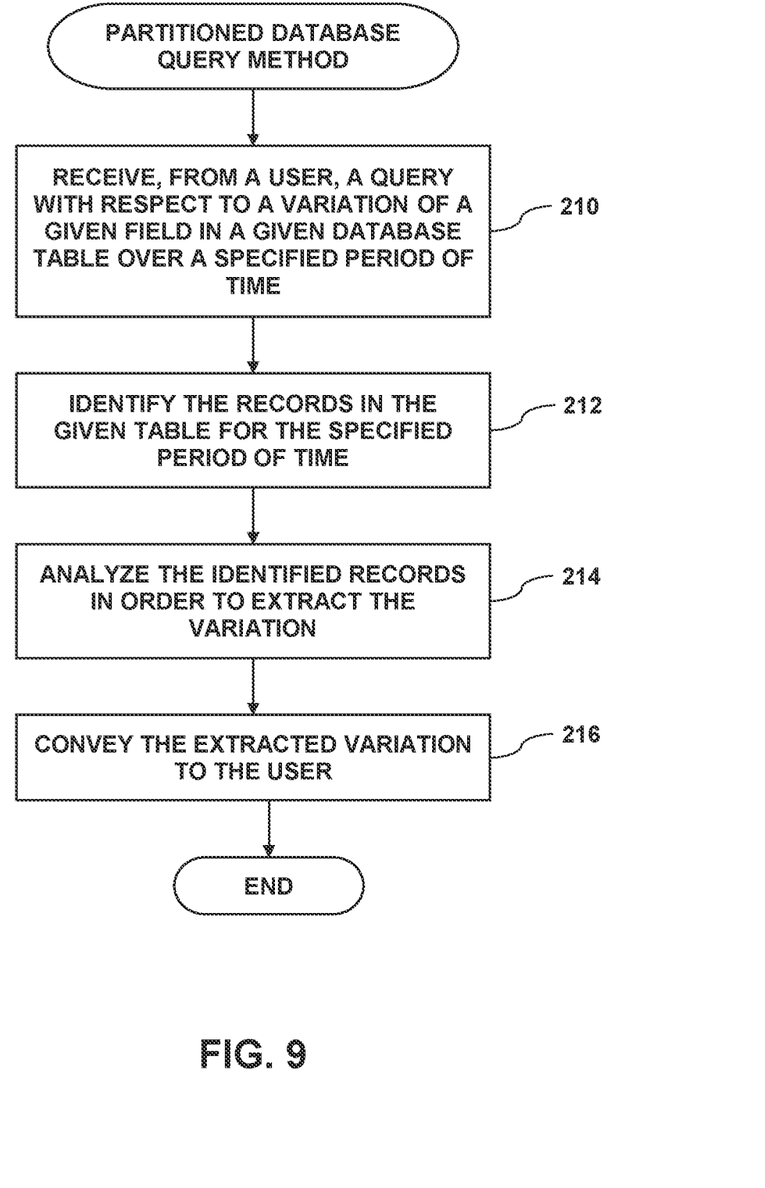
FIG. 9 is a flow diagram that schematically illustrates a method of processing time-based analytic queries on the partitioned database, in accordance with an embodiment of the present invention.

FIG. 9 is a flow diagram that schematically illustrates a method of processing a time-based analytic query on the partitioned tables 23 in partitioned database 22, in accordance with an embodiment of the present invention.

In step 210, partitioned database manager 56 receives, from user 28 (i.e., via client computer 30), a query with respect to a variation of a given field 174 in table 170 over a specified period of time. As described supra, table 170 comprises multiple partitioned tables 23.

For example, the query may comprise a request to identify how many names 174D were added and/or deleted and/or updated on Nov. 12, 2020.

In step 212, partitioned database manager 56 identifies records 172 for the specified period of time, and in step 214, the partitioned database manager analyzes the identified records in order to extract the variation.

Continuing the example described supra, partitioned database manager 56 can perform step 212 by:
Identifying a first set of records 172 for Nov. 11, 2020 (i.e., as indicated by date 174A).
Identifying a second set of records for Nov. 12, 2020.
Analyzing the first and the second set of records to identify how many names 174D are in the second set of records and not in the first set of records.

Finally, in step 216, partitioned database manager 56 presents the extracted variation to user 28, and the method ends. To present the extracted variation to user 28, partitioned database manager 56 can convey the extracted variation to client computer 30, and upon receiving the extracted variation, the client computer can present the extracted variation on display 64.

Figure 10:
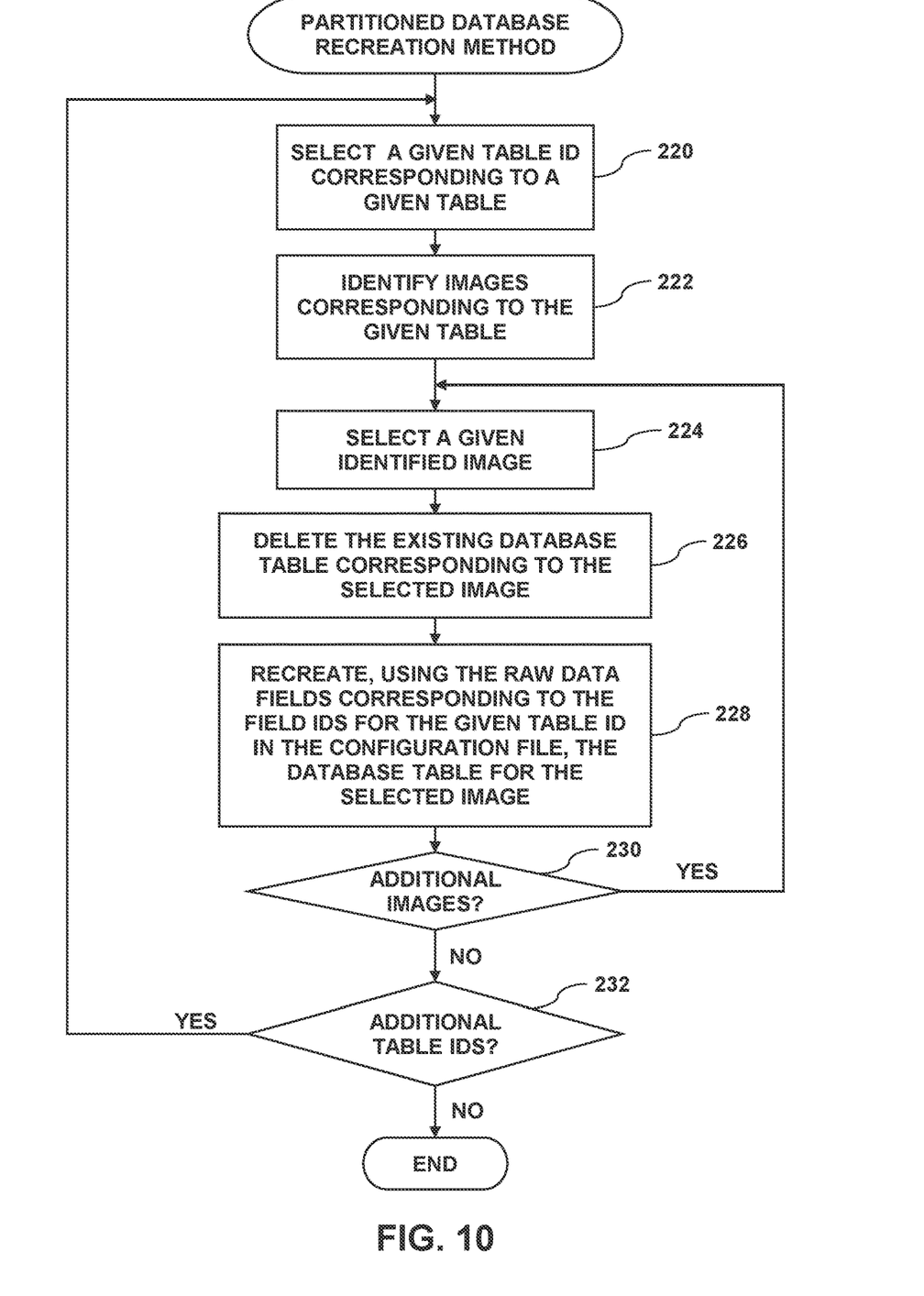
FIG. 10 is a flow diagram that schematically illustrates a method of recreating the partitioned database, in accordance with an embodiment of the present invention.

FIG. 10 is a flow diagram that schematically illustrates a method of recreating partitioned database 22, in accordance with an embodiment of the present invention. As described supra, partitioned database manager 56 can initiate recreating partitioned database 22 upon detecting that reset flag 142 is set.

In step 220, partitioned database manager 56 selects, from configuration file 118, a given table ID 144 corresponding to a given partitioned database table 23.

In step 222, partitioned database manager 56 identifies the archived table images 60 corresponding to the given table 23.

In step 224, partitioned database manager 56 selects a given identified archive table image 60, and in step 226 the partitioned database manager deletes the existing daily database table 112 that corresponds to the selected archive table image 60.

In step 228, partitioned database manager 56 uses the given identified archive image to recreate, using the information stored in configuration file 118, the daily table 112 corresponding to the given identified archive image.

In step 230, if partitioned database manager 56 identifies any of the identified table images (i.e., in step 222) that were not yet selected (i.e., in step 224), then the method continues with step 224.

When partitioned database manager 56 determines that all the identified table images have been selected, then in step 232, partitioned database manager 56 determines if there are any table ids 144 that have not yet been selected in step 220.

If there are any table ids 144 that have not yet been selected in step 220, then the method continues with step 220. If all the table ids 144 have already been selected, then the method ends.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
capturing, by a hardware processor, a series of point-in-time images of a database, wherein the database comprises data that can be periodically updated and queried, wherein the data is stored in multiple fields of multiple records in one or more tables of the database, and wherein the point-in-time images comprise archived copies made at predefined intervals of the data stored in one or more of the tables of the database;
storing, by the hardware processor, raw data fields containing data from the captured series of point-in-time images to a corresponding series of raw data files on a storage device, wherein the raw data files store the raw data fields in a data exchange format in which the raw data fields are not stored at fixed locations in the raw data files;
receiving, from a user, a retrospective query with respect to a variation of a given field in a given table of the database over a specified period of time;
defining a logical table containing values of the given field extracted from the raw data fields in the series of raw data files that were stored over the specified period of time,
wherein defining the logical table comprises generating a partitioned table comprising the data from the series of point-in-time images;
generating and maintaining a unified schema of the database, wherein the unified schema stores respective field names and respective data types for the fields in the table, including any schema changes in the database tables in the series of point-in-time images used to generate the partitioned table;
analyzing, by the hardware processor, the values of the given field in the logical table, by querying the generated partitioned table in order to extract the variation of the given field in the given table over the specified period of time; and
presenting the extracted variation to the user.

2. The method according to claim 1, wherein capturing the point-in-time images comprises capturing the point-in-time images at predefined intervals.

3. The method according to claim 1, wherein the given table comprises a customer relationship management data file.

4. The method according to claim 1, wherein the given table comprises an enterprise resource planning file.

5. The method according to claim 1, wherein the given table comprises an accounting data file.

6. The method according to claim 1, wherein the given table comprises a customer service system data file.

7. The method according to claim 1, wherein the given table comprises a messaging system data file.

8. The method according to claim 1, wherein the given table comprises a set of records, and wherein capturing a given point-in-time image of the database comprising capturing the records in the given table.

9. The method according to claim 8, wherein capturing the records comprises capturing all the records in the given table.

10. The method according to claim 8, wherein capturing the records comprises capturing a subset of the records in the given table.

11. The method according to claim 1, wherein generating a partitioned table comprises generating a column-based partitioned table.

12. The method according to claim 1, wherein the series of point-in-time images comprises a first given image comprising a first set of fields captured at a first time and a second given image comprising a second set of fields captured at a second time subsequent to the first time, and wherein the schema change comprises a given field in the second set that is not in the first set.

13. The method according to claim 12, wherein the point-in-time images captured during the specified period of time comprises the first and the second given images, and wherein presenting the extracted variation comprises presenting the first given image, and presenting, in the first image a specified value for the given field.

14. The method according to claim 1, wherein the series of point-in-time images comprises a first given image comprising a first set of fields captured at a first time and a second given image comprising a second set of fields captured at a second time subsequent to the first time, and wherein the schema change comprises a given field in the first set that is not in the second set.

15. The method according to claim 14, wherein the point-in-time images captured during the specified period of time comprises the first and the second given images, and wherein presenting the extracted variation comprises presenting the second given image, and presenting, in the second image a specified value for the given field.

16. The method according to claim 1, wherein the series of point-in-time images comprises a first given image captured at a first time and a second given image comprising captured at a second time subsequent to the first time, wherein the first given image comprises a field having a first data type, wherein the second given image comprises a field having a second data type, and wherein the schema change comprises a difference between the first and the second data types.

17. The method according to claim 16, wherein the point-in-time images captured during the specified period of time comprises the first and the second given images, and wherein presenting the extracted variation comprises presenting the field in first given image and the second given image using a specified data type.

18. The method according to claim 1, wherein the series of point-in-time images comprise a set of fields, and wherein the partitioned table comprises a subset of the set of fields.

19. The method according to claim 1, wherein the raw data files comprise CSV (comma separated value) files.

20. An apparatus, comprising:
a storage device configured to store a database, wherein the database comprises data that can be periodically updated and queried, and wherein the data is stored in multiple fields of multiple records in one or more tables of the database; and
at least one hardware processor configured:
to capture and store to the storage device a series of point-in-time images of the database, wherein the point-in-time images comprise archived copies made at predefined intervals of the data stored in one or more of the tables of the database,
to store raw data fields containing data from the captured series of point-in-time images to a corresponding series of raw data files on a storage device, wherein the raw data files store the raw data fields in a data exchange format in which the raw data fields are not stored at fixed locations in the raw data files,
to receive, from a user, a retrospective query with respect to a variation of a given field in a given table of the database over a specified period of time,
to define a logical table containing values of the given field extracted from the raw data fields in the series of raw data files that were stored over the specified period of time,
wherein the logical table comprises a partitioned table comprising the data from the series of point-in-time images,
to generate and maintain a unified schema of the database, wherein the unified schema stores respective field names and respective data types for the fields in the table, including any schema changes in the database tables in the series of point-in-time images used to generate the partitioned table,
to analyze the values of the given field in the logical table, by querying the generated partitioned table in order to extract the variation of the given field in the given table over the specified period of time, and
to present the extracted variation to the user.

21. The apparatus according to claim 20, wherein a given processor is configured to capture the point-in-time images by capturing the point-in-time images at predefined intervals.

22. The apparatus according to claim 20, wherein the given table comprises a customer relationship management data file.

23. The apparatus according to claim 21, wherein the given table comprises an enterprise resource planning file.

24. The apparatus according to claim 20, wherein the given table comprises an accounting data file.

25. The apparatus according to claim 20, wherein the given table comprises a customer service system ticket data file.

26. The apparatus according to claim 20, wherein the given table comprises a messaging system data file.

27. The apparatus according to claim 20, wherein the given table comprises a set of records, and wherein a given processor is configured to capture a given point-in-time image of the database by capturing the records in the given table.

28. The apparatus according to claim 27, wherein a given processor is configured to capture the records by capturing all the records in the given table.

29. The apparatus according to claim 27, wherein a given processor is configured to capture the records by capturing a subset of the records in the given table.

30. The apparatus according to claim 20, wherein a given processor is configured to generate a partitioned table by generating a column-based partitioned table.

31. The apparatus according to claim 21, wherein the series of point-in-time images comprises a first given image comprising a first set of fields captured at a first time and a second given image comprising a second set of fields captured at a second time subsequent to the first time, and wherein the schema change comprises a given field in the second set that is not in the first set.

32. The apparatus according to claim 31, wherein the point-in-time images captured during the specified period of time comprises the first and the second given images, and wherein a given processor is configured to present the extracted variation by presenting the first given image, and presenting, in the first image a specified value for the given field.

33. The apparatus according to claim 20, wherein the series of point-in-time images comprises a first given image comprising a first set of fields captured at a first time and a second given image comprising a second set of fields captured at a second time subsequent to the first time, and wherein the schema change comprises a given field in the first set that is not in the second set.

34. The apparatus according to claim 33, wherein the point-in-time images captured during the specified period of time comprises the first and the second given images, and wherein a given processor is configured to present the extracted variation by presenting the second given image, and presenting, in the second image a specified value for the given field.

35. The apparatus according to claim 20, wherein the series of point-in-time images comprises a first given image captured at a first time and a second given image comprising captured at a second time subsequent to the first time, wherein the first given image comprises a field having a first data type, wherein the second given image comprises a field having a second data type, and wherein the schema change comprises a difference between the first and the second data types.

36. The apparatus according to claim 35, wherein the point-in-time images captured during the specified period of time comprises the first and the second given images, and wherein a given processor is configured to present the extracted variation by presenting the field in first given image and the second given image using a specified data type.

37. The apparatus according to claim 20, wherein the series of point-in-time images comprise a set of fields, and wherein the partitioned table comprises a subset of the set of fields.

38. A computer software product for protecting a computing system, the product comprising a non-transitory computer-readable medium, in which program instructions are stored, which instructions, when read by a computer, cause the computer:

to capture a series of point-in-time images of a database, wherein the database comprises data that can be periodically updated and queried, wherein the data is stored in multiple fields of multiple records in one or more tables of the database, and wherein the point-in-time images comprise archived copies made at predefined intervals of the data stored in one or more of the tables of the database;

to store raw data fields containing data from the captured series of point-in-time images to a corresponding series of raw data files on a storage device, wherein the raw data files store the raw data fields in a data exchange format in which the raw data fields are not stored at fixed locations in the raw data files;

to receive, from a user, a retrospective query with respect to a variation of a given field in a given table of the database over a specified period of time;

to define a logical table containing values of the given field extracted from the raw data fields in the series of raw data files that were stored over the specified period of time, wherein the logical table comprises a partitioned table comprising the data from the series of point-in-time images;

to generate and maintain a unified schema of the database, wherein the unified schema stores respective field names and respective data types for the fields in the table, including any schema changes in the database tables in the series of point-in-time images used to generate the partitioned table;

to analyze the values of the given field in the logical table, by querying the generated partitioned table in order to extract the variation of the given field in the given table over the specified period of time; and to present the extracted variation to the user.

* * * * *